May 30, 1950 L. A. PAINE 2,509,364
THERMAL DEMAND METER MOTOR UNIT
Filed Dec. 6, 1946 2 Sheets-Sheet 1

Inventor
Louis A. Paine
By:- Louis Robertson Atty.

May 30, 1950 L. A. PAINE 2,509,364
THERMAL DEMAND METER MOTOR UNIT
Filed Dec. 6, 1946 2 Sheets-Sheet 2

Inventor
Louis A. Paine.
By:-
Louis Robertson Atty.

Patented May 30, 1950

2,509,364

UNITED STATES PATENT OFFICE 2,509,364

THERMAL DEMAND METER MOTOR UNIT

Louis A. Paine, West Lafayette, Ind., assignor to Duncan Electric Manufacturing Company, La Fayette, Ind., a corporation of Illinois Application December 6, 1946, Serial No. 714,397

10 Claims. (Cl. 60—23)

In determining how much a consumer of electric energy should be charged, it is often desirable to know not only the number of kilowatt hours he used but also his maximum demand, namely the maximum rate at which he used electricity during the billing period. The underlying theory is that he should be charged somewhat in proportion to the amount of generating and distribution equipment required to supply his maximum demand.

One form of maximum demand meter is that known as the thermal demand meter in which heaters are heated by the electric current, and bimetallic or other heat responsive means are controlled by the heaters in a manner to be responsive to power consumption.

It has long been recognized as highly desirable to insulate each thermal responsive member, together with the heating means therefor, both from the surrounding air and from the other heaters. Perhaps it should be explained that in this type of instrument it is necessary to heat two thermal responsive members differentially. An obvious reason for this insulation is to conserve energy, so that less electrical energy will be consumed by the thermal demand meter.

According to the present invention, an improved insulating and supporting housing is provided which is highly effective as insulation and is, nevertheless, quite economical in cost. The housing is quite sturdy and yet easily assembled and supported.

Additional objects and advantages of the invention will be apparent from the description and from the drawings in which.

Figure 1:
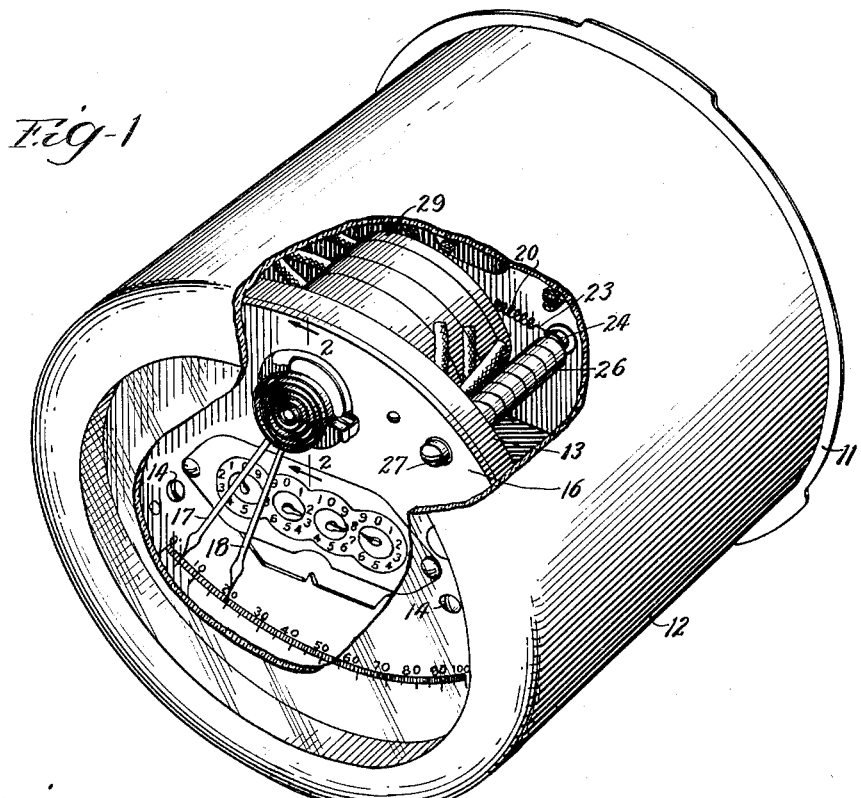
Figure 1 is a perspective view showing a meter embodying the present invention.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

The present invention is shown in conjunction with a combined watt-hour meter and a maximum demand meter. This invention relates especially to the maximum demand meter, which is of the thermal type. The combined meter includes a base 11 which in the illustrated form is a conventional type of base plate adapted for a socket meter. The entire meter structure is carried by this base plate 11 and enclosed within a glass cover 12 which is also carried by the base plate 11. The watt-hour meter structure includes a suitable frame, not clearly shown, to which a thermal demand attachment is applied. The thermal demand attachment is secured to the watt-hour meter structure by a mounting of face plate 13 which is held to the frame by suitable screws 14. The face plate 13 bears a face or dial 16 bearing calibrations along its lower portion adjacent which the two pointers 17 and 18 move. The pointer 17 is the momentary pointer or pusher which pushes the pointer 18 to the position of maximum demand and recedes therefrom as the demand decreases. At the end of the billing period the meter reader will operate a reset knob or lever, which has been omitted for the sake of clarity, which will return the maximum pointer 18 to the zero position or to the then momentary position of the pointer 17. The pointer 17 is positioned by a shaft 19. The shaft 19 is influenced by a hair spring 21 and by a lever 22. The lever 22 is biased toward the zero position by tension spring 20 and a flexible strand 23 which is wound on a small drum 24 which is biased with a biasing force varying with temperature by a bimetallic coil spring 26 adjusted by a head 27 adapted to receive a screw driver. The present invention, however, relates primarily to the thermal responsive assembly 29 and its mounting.

*Thermal responsive assembly*

Figure 2:
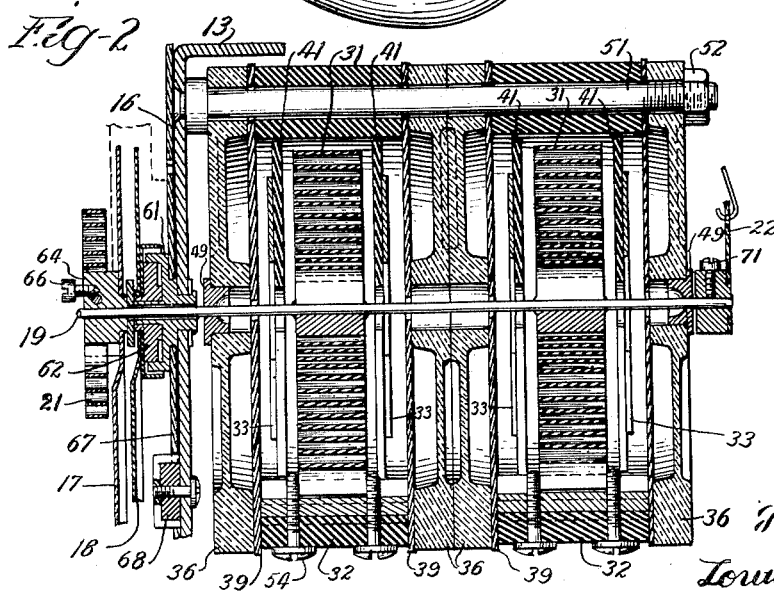
Fig. 2 is a vertical, sectional view taken longitudinally through the thermal meter unit, approximately on the line 2—2 of Fig. 1.

As seen best in Fig. 2, the thermal responsive assembly includes a pair of bimetallic coils 31, each of which is connected at one end to indicator shaft 19 and at the other end to a cylinder 32 forming part of the housing for the bimetallic coils. Each of the bimetallic coils 31 is influenced by a pair of heaters 33. The circuit for these heaters is not new with the present invention and, therefore, need not be described, it being any conventional circuit for a thermal type of watt-demand meter.

In such meters, it is desirable that each thermal responsive device and its heaters be well insulated from the other and from the surrounding air. This conserves energy and, with a given amount of energy consumption, has a desirable effect on the operating characteristics of the meter. According to the present invention, a housing is provided which, at relatively low cost, provides exceptionally good insulating characteristics, and also forms an inexpensive mounting for the assembly.

Figure 3:
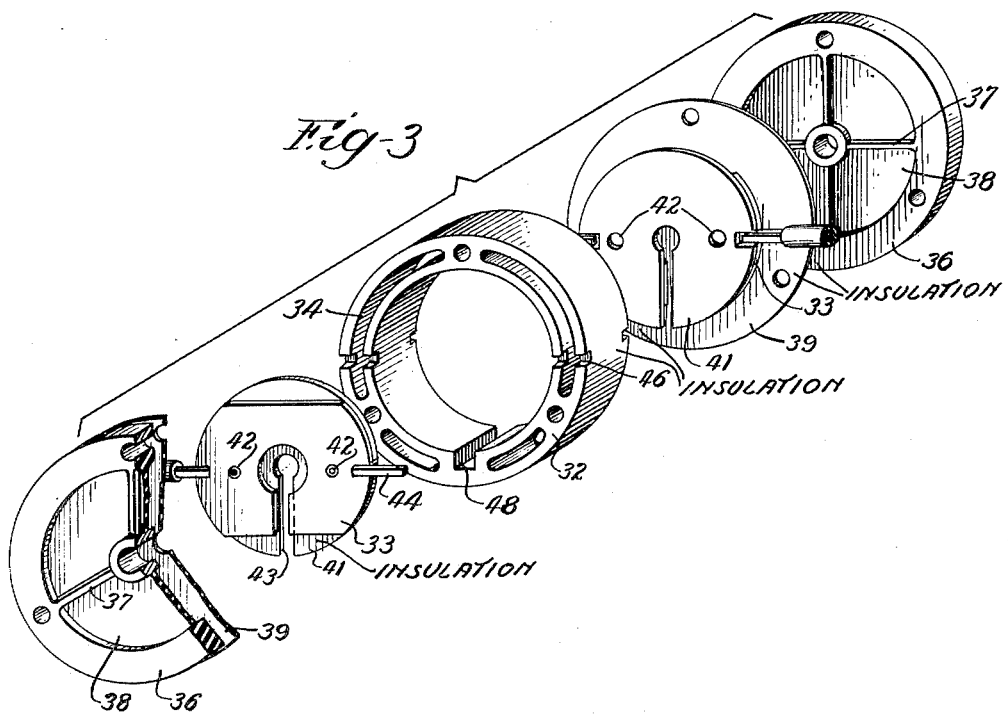
Fig. 3 is an exploded view of the housing and heater parts seen in Fig. 2.
Figure 4:
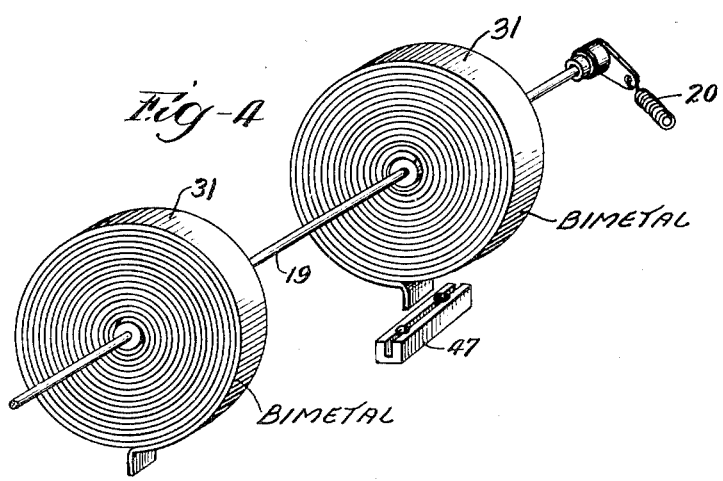
Fig. 4 is a view corresponding to Fig. 3 but showing the shaft, bimetallic coils, and associated parts removed from the housing.

The housing assembly is probably best seen in Fig. 3, where the housing for one of the thermal responsive coils is shown. The cylinder 32 comprises the main body of the housing. It will be observed that the cylinder is of double-wall construction so that substantially throughout its periphery there is an air chamber 34. The cylinder 32 may be economically formed by molding from any of the materials generally known as synthetic plastics, or like materials. These materials have the advantage of being electrical insulators and also being poor conductors of heat and that they aid the double-wall construction in insulating the chambers.

Secured across each end of the cylinder 32 is an end plate 36 which also is preferably molded of a synthetic plastic. The end plate is preferably provided on each side with narrow ribs 37 separating recesses 38. The ribs on one side are preferably staggered with respect to those on the other side, and the number need not be the same. Between each end plate and the cylinder 32 is positioned an insulating disc 39 which may be formed of heavy paper, which may be impregnated with a resin if desired. The discs 39 close off the recesses 38 so that they become insulating air chambers and the ends walls are thus of double-wall construction. Positioned inwardly from each of the discs 39 is one of the heaters 33. These heaters may be in contact with the disc 39 or slightly spaced therefrom, the latter being preferred because it results in less heat loss through the disc 39.

As seen in Fig. 2, each bimetallic coil 31 lies between its associated heaters 33. Preferably, the coil 31 is separated from the heaters by insulating washers 41. These are desirable, both for their electrical insulating properties and to slightly retard the reaction of the bimetallic coils 31 to the heat generated by the heaters 33. A delayed response to the heaters is desirable so that the demand indicator will tend to indicate average demand over, say, fifteen minutes, rather than indicating a very high demand that may have lasted for only a much shorter interval.

From the foregoing, it is seen that each thermal responsive sub-assembly is well insulated by a housing which includes a double-wall construction substantially throughout the area of the housing.

Assembly

The assembly of the structure seen in Fig. 2 is quite simple. The shaft 19 is threaded in turn through one of the bimetallic coils 31, one of the discs 39, two of the end plates 36 (with a paper disc between them if preferred) and then through another disc 39 and finally through the second bimetallic coil 31. The two coils 31 are secured to the shaft 19 at proper points thereon, by soldering or in any other suitable manner.

The rest of the housing parts may now be slipped onto the shaft 19 from the two ends thereof. Before they are closed against one another, the four heaters 33 with the washers 41 attached thereto as by fibre rivets 42 are slipped in place, the slot 43 permitting them to slip laterally onto the shaft 19 if desired and the lead-in conductors 44 fitting into notches 46 in the cylinder.

As the cylinders 32 are slipped over the bimetallic coils 31, blocks 47, having been applied to the outer ends of the coils, will slip into slots 48 formed in the cylinders 32. Bearing bushings 49 are next slipped over the ends of the shaft 19 and pressed into the central openings of the outer end plates 36.

In the meantime, three studs 51 have been secured to mounting plate 13 by an upsetting process as indicated at the top of Fig. 2. Now the thermal responsive assembly is slipped onto the three studs 51, and nuts 52 are applied to the studs to simultaneously secure the assembly thereon and clamp the parts of the assembly together.

The blocks 47 may be secured in place in the slots 48 by screws 54.

Grease dampening

As the thermal assembly is placed on the studs 51, the shaft 19 will pass through a cupped bushing 61. The maximum demand pointer 18 is carried by a collar 62 which rides on a central forwardly extending hub of this bushing 61, and extends into the cupped portion of the bushing. Between the faces of the collar 62 and the bushing 61, there is preferably provided a small amount of grease of a type which will maintain a substantial constant viscosity throughout the range of temperatures which will be commercially encountered. The preferred grease is a silicone grease, sold as "Stop Cock Grease" by the Dow Corning Corporation of Midland, Michigan. This grease acts as a very satsifactory dampener to prevent improper movement of the pointer 18 by jars or vibrations.

The pusher pointer 17 is secured to a collar 64 which is secured to the shaft 19 by means of a set screw 66 which presses a ball against the shaft. The collar 64 is secured to one end of hair spring 21, the other end of which is secured, in a manner not shown, to a gear 67 which may be turned by a slotted pinion 68 to adjust the tension of the hair spring 21 to adjust the pusher 17 to zero, this adjustment being made after the meter has reached a stable condition with no load, but connected in the circuit. The lever 22 is slipped on the rear end of the shaft 19 and secured thereto by a set screw 71, the position of the lever 22 on the shaft 19 being such that with the pointer 17 at zero the lever 22 is in alignment with the strand 23 so that the strand 23 exerts a zeroizing force. This force is zero when the pointer is in the zero position but gradually decreases when the pointer is not in the zero position. With any angular position, the amount of the force can be manually adjusted by turning the slotted head 27 and is automatically adjusted by changes of temperature through the action of the bimetallic coil 26.

From the foregoing it is seen that a thermal type of maximum demand meter has been provided which is reasonably inexpensive in construction, easily assembled, and which, nevertheless, provides a very sturdy mounting and a very well insulated housing for the thermal responsive elements.

I claim:

1. A thermal demand meter unit including an output shaft, a pair of bimetallic coils oppositely spiraled about said shaft and connected thereto, heating means for heating said coils differentially, and an insulating and supporting housing for said coils including a double-walled cylinder around each coil, and end plate assemblies substantially closing both ends of each cylinder and enclosing the coil and heating means within the cylinder and between adjacent end plate assemblies, said end plate assemblies each including a recessed insulating member and a disc lying across the recesses to form an air chamber with the insulating member, whereby each coil and its heating means is substantially surrounded by a double-walled construction.

2. A thermal demand meter unit including an output shaft, a pair of bimetallic coils oppositely spiraled about said shaft, and connected thereto, heating means for heating said coils differentially, and an insulating and supporting housing for said coils including a double-walled cylinder around each coil, and end plate assemblies substantially closing both ends of each cylinder and both ends of the space between the walls, and enclosing the coil and heating means within the cylinder and between adjacent end plate assemblies, said end plate assemblies each including a recessed insulating member and a disc lying across the recesses to form an air chamber with the insulating member, whereby each coil and its heating means is substantially surrounded by a double-walled construction.

3. A thermal demand meter unit including an output shaft, a pair of bimetallic coils oppositely spiraled about said shaft and connected thereto, heating means for heating said coils differentially, and an insulating and supporting housing for said coils including a double-walled cylinder around each coil, and end plate assemblies substantially closing both ends of each cylinder and enclosing the coil and heating means therein, said end plate assemblies each including a recessed insulating member and a disc lying across the recesses to form an air chamber with the insulating member, whereby each coil and its heating means is substantially surrounded by a double-walled construction, each cylinder being provided with an axially extending slot and each coil being provided at its outer end with a block to which it is secured and which fits said slot.

4. A thermal demand meter unit including an output shaft, a pair of bimetallic coils oppositely spiraled about said shaft and connected thereto, heating means for heating said coils differentially, and an insulating and supporting housing for said coils including a double-walled cylinder around each coil, and end plate means substantially closing both ends of each cylinder and enclosing the coil and heating means within the cylinder and between adjacent end plate means, said end plate means each being formed of double wall construction, whereby each coil and its heating means is substantially surrounded by a double-walled construction.

5. A thermal demand meter unit including an output shaft, a pair of bimetallic coils oppositely spiraled about said shaft and connected thereto, heating means for heating said coils differentially, and an insulating and supporting housing for said coils including a double-walled cylinder around each coil, and end plate means substantially closing both ends of each cylinder and enclosing the coil and heating means therein, each cylinder being provided with an axially extending slot and each coil being provided at its outer end with a block to which it is secured and which fits said slot.

6. A thermal demand meter unit including an output shaft, a pair of bimetallic coils oppositely spiraled about said shaft and connected thereto, heating means for heating said coils differentially, and an insulating and supporting housing for said coils including a cylinder around each coil, and end plate means substantially closing both ends of each cylinder and enclosing the coil and heating means therein, each cylinder being provided with an axially extending slot and each coil being provided at its outer end with a block to which it is secured and which fits said slot.

7. A thermal demand meter unit including a support plate, studs carried by the support plate, and a housing carried by the studs, including parts applied successively to said studs, namely, an end plate, a cylinder, intermediate end plate means, another cylinder, and a final end plate, and screw means cooperating with the studs to clamp said parts together and to the supporting plate, bimetallic coils and heater means enclosed with the chambers formed by the cylinders and associated end plates, and a shaft connected to one end of each of said coils, the other ends being anchored.

8. A thermal demand meter unit including a support plate, studs carried by the support plate, and a housing carried by the studs, including parts applied successively to said studs, namely, and end plate, a cylinder, intermediate end plate means, another cylinder, and a final end plate, and screw means cooperating with the studs to clamp said parts together and to the supporting plate, and bimetallic coils and heater means enclosed with the chambers formed by the cylinders and associated end plates, said coils being heat-secured to a shaft and being secured to the cylinders by axially shiftable connections whereby assembly is facilitated.

9. A thermal demand meter unit including an output shaft, a pair of bimetallic coils oppositely spiraled about said shaft, and connected thereto, heating means for heating said coils differentially, and an insulating and supporting housing for said coils including a cylinder of insulative material around each coil, and end plate assemblies substantially closing both ends of each cylinder, and enclosing the coil and heating means within the cylinder and between adjacent end plate assemblies, said end plate assemblies each including a recessed insulating member and a disc lying across the recesses to form an air chamber with the insulating member, whereby each heating means is insulated by a double-walled construction on its side remote from its associated coil.

10. A thermal demand meter unit including an output shaft, a pair of bimetallic coils oppositely spiraled about said shaft and connected thereto, heating means for heating said coils differentially, and an insulating and supporting housing for said coils including a double-walled cylinder around each coil, and end plate means substantially closing both ends of each cylinder and enclosing the coil and heating means within the cylinder and between adjacent end plate means, the cylinder being of one piece with the double walls separated by slots extending from edge to edge of the cylinder, interrupted by axially disposed webs between the walls, and closed by the end plate means.

LOUIS A. PAINE.

REFERENCES CITED

The following references are of record in the file of this patent:

UNITED STATES PATENTS

| Number | Name | Date |
|---|---|---|
| 2,323,738 | Vassar | July 6, 1943 |